(12) United States Patent
Almanstoetter et al.

(10) Patent No.: US 7,021,153 B2
(45) Date of Patent: Apr. 4, 2006

(54) MEASURING DEVICE

(75) Inventors: Andreas Almanstoetter, Klosterlechfeld (DE); Franz Huber, Markt Wald (DE)

(73) Assignee: Hilti Aktiengesellschaft, Schaan (LI)

( * ) Notice: Subject to any disclaimer, the term of this patent is extended or adjusted under 35 U.S.C. 154(b) by 41 days.

(21) Appl. No.: 10/820,333

(22) Filed: Apr. 8, 2004

(65) Prior Publication Data

US 2004/0200290 A1 Oct. 14, 2004

(30) Foreign Application Priority Data

Apr. 11, 2003 (DE) ................. 103 16 632

(51) Int. Cl.
*F16B 31/02* (2006.01)
(52) U.S. Cl. .............................. 73/761; 73/762
(58) Field of Classification Search .............. 411/8, 411/13, 14; 73/761, 762
See application file for complete search history.

(56) References Cited

U.S. PATENT DOCUMENTS

| | | | |
|---|---|---|---|
| 3,948,141 A * | 4/1976 | Shinjo | 411/10 |
| 6,425,718 B1 * | 7/2002 | Herr et al. | 411/10 |
| 6,609,865 B1 * | 8/2003 | Daigneault | 411/13 |

FOREIGN PATENT DOCUMENTS

| | | |
|---|---|---|
| DE | 7821489 | 7/1978 |
| DE | 3148730 | 7/1983 |
| DE | 9311897 | 10/1993 |
| EP | 0910750 | 4/1999 |
| GB | 2194062 A * | 2/1988 |

* cited by examiner

Primary Examiner—Max Noori
(74) Attorney, Agent, or Firm—Abelman, Frayne & Schwab

(57) ABSTRACT

A measuring device (1; 21; 33) for controlling an installation torque of a fastening element (4; 32) and securable to engagement means (3; 35) of the fastening element (4; 32), includes an indicator (5; 24) for a visual display of the installation torque, a plurality of microcapsules filled with a dispersible color die and supported on the indicator (5; 24), and a transparent, at least regionwise, covering (7.1; 7.2; 22) provided on an outer surface of the indicator (5; 24); and an opening (27) through which a fastening element (4; 32) can extend.

6 Claims, 2 Drawing Sheets

MEASURING DEVICE

BACKGROUND OF THE INVENTION

1. Field of the Invention

The present invention relates to a measuring device for controlling an installation torque of a fastening element, in particular, for controlling an installation torque of a dowel, a screw or the like and securable to the engagement means of the fastening element. The measuring device has an opening through which a fastening element can extend and includes an indicator for a visual display of the installation torque, and a plurality of microcapsules supported on the indicator. The microcapsules are filled with at lest one dispersible color die. The present invention further relates to a fastening system including a fastening element, in particular, a dowel, a screw or the like, and a measuring device.

2. Description of the Prior Art

For controlling a torque applied to a fastening element, e.g., a dowel and the like, the engagement means of the fastening element, e.g., a screw head of a dowel, can be provided, e.g., with a breakable cap that breaks at a certain load. The breakable caps are generally expensive and their manufacturing is associated with noticeable costs.

A drawback of the control mechanism, which uses breakable caps or the like, consists in that they indicate only the instantaneous torque applied to a fastening element. It is more important, however, to control the pre-stressing force of a fastening element.

U.S. Pat. No. 3,948,141 discloses a load indicating washer provided with an insert or a microcapsule with a color material that is pressed out sidewise under a certain load.

German Utility Model DE 78 21 489U1 discloses a load indicating washer in which for a better sidewise release of the inserted material, there are provided outlet channels extending up to the outer circumference of the washer.

U.S. Pat. No. 6,425,718 discloses a washer having indentations with different depths and filled with extrudable color materials. Upon tightening of a bolt, under a compression force, the colored material is extruded sidewise. The degree of the applied tension is determined by the color of the extruded material.

The drawback of the known solutions consists in that the sidewise extrudable color material can soil a visible region of a fastening element. Besides, the inserted material can change its characteristics under external influences, e.g., become brittle, which would not insure a precise determination of the tension applied to a fastening element. Moreover, the known solutions are applied, primarily, only to one type of a fastening element.

Accordingly an object of the present invention is to provide a measuring device that would insure a high precision of a visual control of the tension applied to a fastening element.

Another object of the present invention is to provide a measuring device that can be universally used and cost-effectively manufactured.

A further object of the present invention is to provide a measuring device the elements of which would not soil the visible region of a fastening element.

SUMMARY OF THE INVENTION

These and other objects of the present invention, which will become apparent hereinafter, are achieved by providing, in a measuring device described in the introduction to the specification, a transparent, at least regionwise, covering on an outer surface of the indicator.

The measuring device according to the present invention is arranged between the engagement means of a fastening element, e.g., between a dowel head, a screw head, or a nut, and a washer. The radial dimension of the measuring device, preferably, corresponds, at most, to outer dimensions of a standard washer. The inventive measuring device can also be arranged directly on a constructional component, between the constructional component and the engagement means of a fastening element. In addition to its use with types of fastening elements mentioned above, the inventive measuring device can be used with a bolt driven into a constructional component with a bolt setting tool.

When an installation torque is applied to a fastening element, it produces a pre-stressing force and a surface pressure acting on the indicator. The change in color, which results from the application of the surface pressure, is visualized through the at least regionwise transparent covering. The user, thus, can be insured that a necessary installation torque, e.g., the necessary pre-stress is applied to the fastening element.

As an indicator, e.g., a foil with microcapsules, which are arranged thereon, can be used. The foil can be provided, e.g., on one of its surfaces with a glue layer and with a protective covering. In this way, the foil, if necessary, can be glued to the washer or a constructional component before being delivered to an operational site.

The at least partially transparent covering can be formed, e.g., of plexiglas. Advantageously, the transparent, the transparent covering is provided over the entire, visible from outside, region of the measuring device and not only regionwise. The transparent covering in the advantageous embodiment is formed as an annular ring. Advantageously, the transparent covering and/or its adjacent regions is/are provided with a nose formed as a projection that encircles the adjacent washer, so that no color die, which can soil the visible, from outside, region of a fastening element can flow sidewise from the inventive measuring device. If the material for the transparent covering has an adequate resistance against the applied pressure load, the entire indicator or the entire surface of the measuring device can be covered with a transparent covering.

Preferably, the transparent covering has at least one capillary gap or slot. Within this slot, the at least one color die, which flows out of the microcapsules, can be better distributed than is the case when a flat element is used a flat region of which is closely fitted to its another flat region. Advantageously, a plurality of capillary slots is provided in the transparent covering, in particular when the transparent covering is formed as an annular ring or as large annular segment sections. The capillary slots can be so formed that they extend in a direction toward the outer circumference of the measuring device. In order to prevent an inadvertent sidewise flow of the at least one color die out of the inventive measuring device, however, the capillary slots are so formed that they do not extend up to the outer circumference of the transparent covering.

Advantageously, the measuring device includes a washer, and the indicator is located between the washer and the transparent covering. In particular, when the indicator is formed as a foil, the foil can be secured, e.g., glued to the operational side of the washer or be secured in some other way.

Advantageously, the indicator includes at least two types of microcapsules with different color dies, with the microcapsule of the first type breaking at a smaller load, and with the microcapsule of the second type breaking at a larger load. With this embodiment of the present invention, e.g., two different pre-stressing torques can be determined. After a minimal pre-stressing torque, microcapsules, which are filled, with e.g., green die, can break. The user can, in this way, ascertain that the applied pre-stressing torque reached the predetermined or necessary value. When a predetermined maximal pre-stressing torque is exceeded, microcapsules, e.g., with red die break, and the user can ascertain that the applied pre-stressing torques exceeded the maximal value. With the use of different color dies, it can be determined that pre-stressing torque acts on the fastening element. In addition, to the above-described green/red combination, additional combinations of more than two color dies can be implemented.

The embodiment of the present invention according to which the measuring device includes microcapsules of two different types, can be used, e.g., in underground works when a rock anchor is used, for an early determination of a possible overload of the rock anchor. The rock anchor is tightened in order that a predetermined pre-stressing torque is reached, which the user recognizes by observing the first color coding, e.g., yellow, which is exhibit by the measuring device. When the pre-stressing torque in the rock anchor approaches, as a result of movements in the constructional component, the maximal allowable load value of the rock anchor, the color code changes, e.g., to a violet. In this way, by monitoring the rock anchor, a malfunction of the rock anchor can be determined earlier from outside.

Advantageously, the microcapsules are filled with fluorescent color dies. A fluorescent color die shines in the dark and is easily recognizable in badly illuminated areas, e.g., underground or in cellars of newly built structures.

The inventive fastening system includes a fastening element, e.g., a dowel, screw, or the like, and an inventive measuring device. The fastening system can be assembled at a work site and be delivered to a user as a unit.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
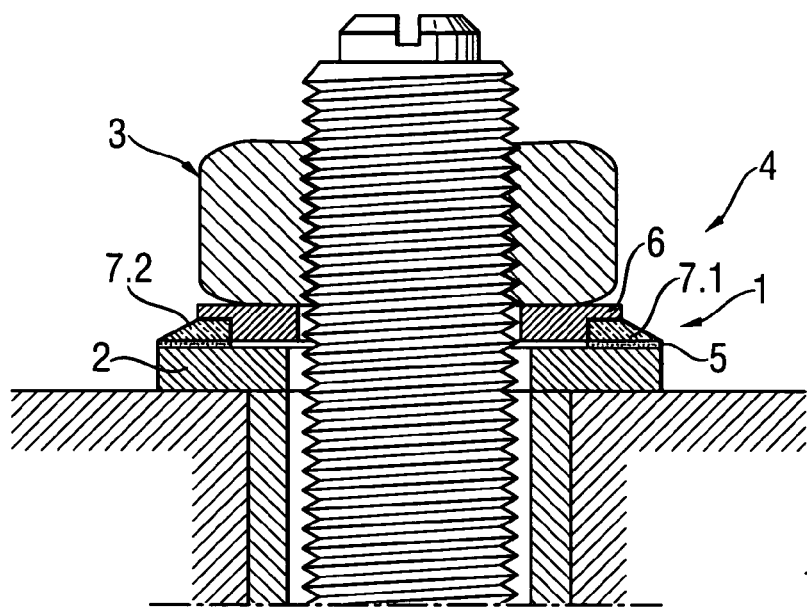
FIG. 1 a cross-sectional view of a first embodiment of a measuring device according to the present invention.

A measuring device 1 according to the present invention, which is shown in FIG. 1, is arranged between a washer 2 and a nut 3 of a dowel element 4. The measuring device 1 includes indicator means 5 in form of a pressure sensor foil on which microcapsules, which are filled with dispersible color dies, are arranged. The measuring device 1 further includes a covering 6 formed of several transparent cover sections 7.1 and 7.2 located along the circumference of the measuring device 1 on the visible outer surface of the measuring device 1.

Upon tightening of the dowel element 4, surface pressure, which acts on the pressure sensor foil that serves as the indicator means 5, increases. Upon the surface pressure reaching a predetermined value, the micro capsules break, and the enclosed color die flows out. The color die, which flows out from the capsules, causes the change of color of the pressure sensor foil that forms the indicator means 5. The color change is visible from outside through the transparent cover sections 7.1 and 7.2.

According to an embodiment of the present invention, two different types of microcapsules can be arranged on the pressure sensor foil, with the microcapsule breaking at different surface pressures and being filled with different color dies. The first type of the microcapsule breaks upon the load reaching a first value, and the second type of the microcapsules breaks under a second, e.g., greater load values. Thereby, with the measuring device according to the present invention, reaching a set value and reaching of a maximal value of the dowel element are visually displayed.

Figure 2:
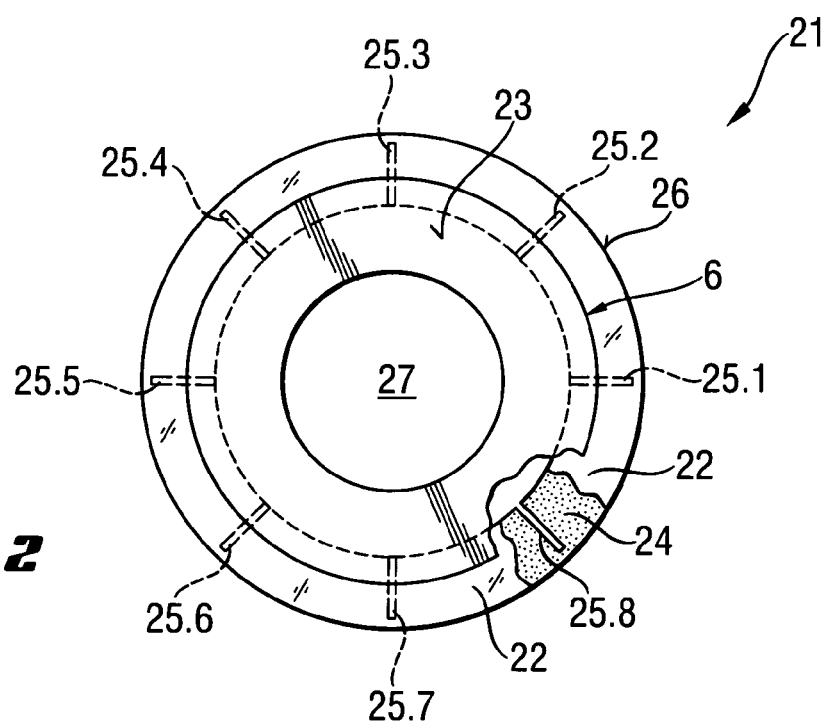
FIG. 2 a plan view of a second embodiment of a measuring device according to the present invention.

A second embodiment of a measuring device 21 according to the present invention, a plan view of which is shown in FIG. 2, is substantially similar to the first embodiment shown in FIG. 1, and differs therefrom in that the transparent covering is formed as an annular element 22 extending along the entire circumference of the measuring device 1. When the material of the transparent covering has adequate pressure-resistance characteristics, the contact region 23 can be formed, together with engagement means, e.g., with a screw head or the nut 3 of the attachment means, as a transparent covering. As shown in FIG. 2, there is also provided an opening 27 through which attachment means can pass.

Under the transparent annular element 22, the pressure sensor foil, which forms the indicator means 5, together with microcapsules, is arranged. For better distribution of the color die, which flows from the microcapsules upon breaking of the same, there are provided, around the circumference of the measuring device 2, a plurality of capillary slots 25.1–25.8 which facilitate dispersion of the color die. Radially, the slots 25.1–25.8 do not extend up to the outer circumference 26 of the annular element 22. Functionally, the measuring device 21 corresponds substantially to the described above, measuring device 1.

The annular element 22 can be provided with a projection on its outer circumference 26 that would engage the edge of the adjacent washer, preventing a sidewise flow of the dispersed color die out of the measuring device 21.

Figure 3:
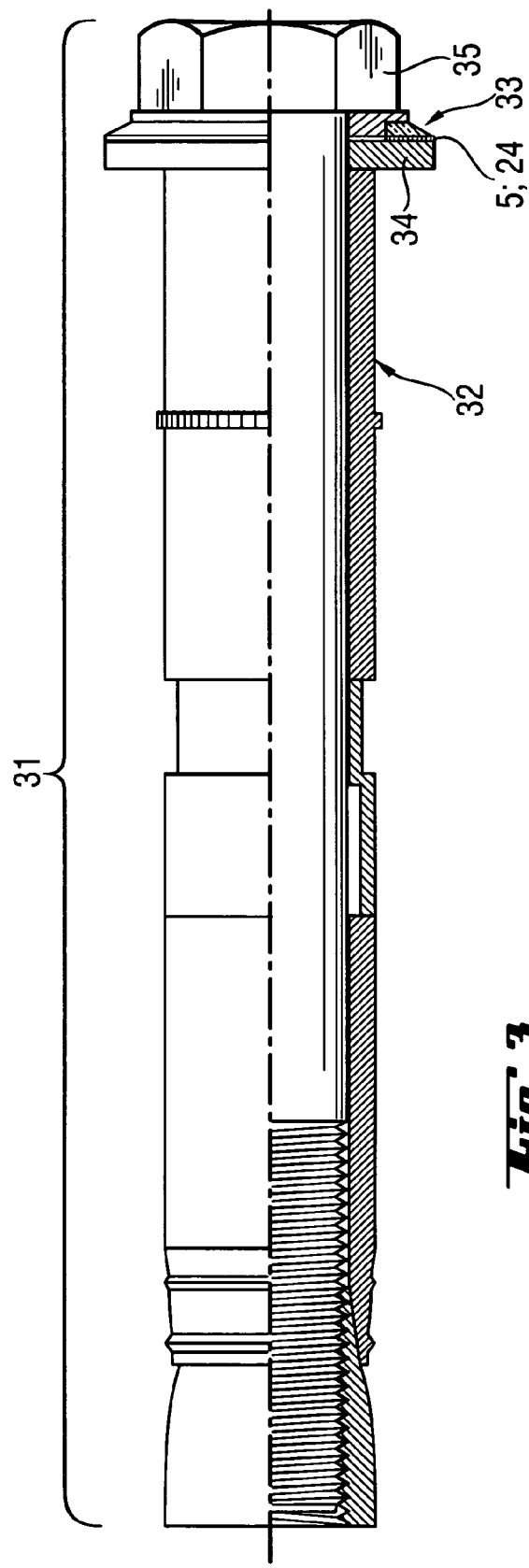
FIG. 3 a partially cross-sectional, longitudinal view of fastening system according to the present invention.

FIG. 3 shows, as it has been already discussed above, a longitudinal, partially cross-sectional view of fastening system according to the present invention. The fastening system 31 includes a dowel element 32 and a measuring device 33 which is located between the washer 34 and a hexagon head 35. The measuring device 33 can be arranged on the washer 34 at the work site. Alternatively, the entire fastening system can be assembled at the work site and be used as a single element, without loosable parts.

In summary, according to the present invention, there are provided a measuring device and a fastening system having a highly precise, visual control of an applied, to the fastening element, tightening force, and which can be universally used and cost-effectively produced. Further, soiling of the visible regions of the fastening element by elements of the measuring device is prevented.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A measuring device (1; 21; 33) for controlling an installation torque of a fastening element (4; 32) and securable to engagement means (3; 35) of the fastening element (4; 32), the measuring device (1; 21; 33) comprising indicator means (5; 24) for a visual display of the installation torque; a plurality of microcapsules filled with a dispersible color dye and supported on the indicator means (5; 24); at least partially transparent covering (7.1; 7.2; 22) provided on an outer surface of the indicator means (5; 24) the indicator means (5, 24) being visible through a transparent region of the covering; and an opening (27) through which a fastening element (4; 32) can extend.

2. A measuring device according to claim 1, wherein the covering (22) has at least one capillary slot (25.1–25.8) provided in the transparent region of the covering.

3. A measuring device according to claim 1, further comprising a washer (2; 34), the indicator means (5; 24) being located between the washer (2; 34) and the covering (7.1; 7.2; 22).

4. A measuring device according to claim 1, wherein the plurality of microcapsules comprises at least two types of microcapsules filled with different color dyes, and wherein a microcapsule of a first type breaks under a smaller load than a microcapsule of a second type.

5. A measuring device according to claim 1, wherein the plurality of microcapsules is filed with a fluorescent color dye.

6. A fastening system, comprising a fastening element (32); and a measuring device (33) having an opening (27) through which the fastening element (33) is extendable, indicator means (5; 24) for a visual display of an installation torque, a plurality of microcapsules filled with a dispersible color die and supported on the indicator means (5; 24), and at least partially transparent covering (7.1, 7.2; 22) provided on an outer surface of the indicator means (5; 24), the indicator means being visible through a transparent region of the covering.

* * * * *